(12) United States Patent
Zhou et al.

(10) Patent No.: US 11,055,864 B2
(45) Date of Patent: Jul. 6, 2021

(54) METHOD AND APPARATUS FOR DETERMINING A GEOGRAPHIC POSITION OF A TARGET OBJECT ON A STREET VIEW MAP

(71) Applicant: Nanjing Polagis Technology Co. Ltd, Jiangsu (CN)

(72) Inventors: Liangchen Zhou, Jiangsu (CN); Zhengyuan Lu, Jiangsu (CN); Guonian Lu, Jiangsu (CN)

(73) Assignee: Nanjing Polagis Technology Co. Ltd, Jiangsu (CN)

( * ) Notice: Subject to any disclaimer, the term of this patent is extended or adjusted under 35 U.S.C. 154(b) by 69 days.

(21) Appl. No.: 16/421,476

(22) Filed: May 24, 2019

(65) Prior Publication Data

US 2020/0372666 A1 Nov. 26, 2020

(51) Int. Cl.
*G06T 7/55* (2017.01)
*G06T 7/73* (2017.01)
*G06T 7/00* (2017.01)

(52) U.S. Cl.
CPC .......... *G06T 7/55* (2017.01); *G06T 7/74* (2017.01); *G06T 7/97* (2017.01); *G06T 2207/10028* (2013.01)

(58) Field of Classification Search
None
See application file for complete search history.

(56) References Cited

U.S. PATENT DOCUMENTS

| | | | |
|---|---|---|---|
| 6,845,338 B1* | 1/2005 | Willins | G01C 21/20 702/150 |
| 2015/0193664 A1* | 7/2015 | Marti | A61B 5/18 382/103 |
| 2019/0367030 A1* | 12/2019 | Tanaka | G08G 1/202 |
| 2020/0191556 A1* | 6/2020 | Jia | B64C 39/024 |
| 2020/0193643 A1* | 6/2020 | Hess | G06K 9/00818 |

\* cited by examiner

*Primary Examiner* — Tahmina N Ansari
(74) *Attorney, Agent, or Firm* — Proi Intellectual Property US; Klaus Michael Schmid

(57) ABSTRACT

The present invention proposes a method and apparatus for three-dimensional measurement and calculation of the geographic position of a target object based on a street view map. The method comprises, among others: selecting a target object in a street view map at first and then selecting two appropriate viewpoints according to the target object; adjusting the bottom/top of the target object to the central position of the street view map under each viewpoint and obtaining viewpoint parameters from the viewpoints to the bottom/top of the target object; determining two spatial straight lines according to the longitudes and latitudes of the viewpoints and the viewing angles from the viewpoints to the bottom of the target object and calculating the intersection of the two straight lines, which is the longitude and latitude of the target object in the actual geographic space.

10 Claims, 2 Drawing Sheets

METHOD AND APPARATUS FOR DETERMINING A GEOGRAPHIC POSITION OF A TARGET OBJECT ON A STREET VIEW MAP

TECHNICAL FIELD

The present invention relates to the fields of street view map, electronic cartography, photogrammetry, GIS, Web service and computer graphics, is designed to achieve direct measurement of actual geographic positions of target objects in a street view map on the basis of the existing street view map resources and specifically relates to Http request, determination of spatial straight lines under a polar coordinate system, forward intersection and other contents.

DESCRIPTION OF THE BACKGROUND

Street view map is a live map service. It provides users with street panorama of cities, streets or other environments in a range of 360° in the horizontal direction and 180° in the vertical direction so that the users can view scenes in different positions of and on the two sides of each street on the ground of the selected city. It is a three-dimensional virtual display technology, which uses a plurality of cameras to conduct multi-angle surrounding image acquisition of real scenes and then uses a computer to conduct post fusion processing and loads a player.

In recent years, following the rapid development of Internet technology, more and more application services on the basis of panorama image information, such as three-dimensional panorama and virtual tour, have entered people's daily life. Street view map achieves the scenes of virtual reality that are in combination of 2D and 3D, making users as if personally on the scenes.

Currently, IT and Internet companies like foreign Google and domestic Baidu and Tencent all have launched map service of city street view. However, these street view maps are mainly for exhibition and display, seriously wasting the enormous information contained in street view images. Compared with conventional 2D maps, street view maps are unable to achieve positioning and measurement of surface features in street view images, significantly limiting the extensive application of panoramic technique.

To tackle the defect that existing street view maps can be used for exhibition and display only, the present invention provides a three-dimensional measurement and calculation method based on a street view map to achieve fast acquisition of actual geographic coordinates and heights of surface features in street view images.

SUMMARY OF THE INVENTION

The present invention is intended to solve the problem that existing street view maps are unable to acquire the actual geographic coordinates, height and other information of target objects in street view images. On the basis that a street view map provides more authentic, accurate and detailed map service for users, the present invention may measure the actual geographic positions and heights of target objects in the street view map, utilize the specific and rich information in the street view map and expand the application of street view in real production and life.

In order to achieve the foregoing technical objective, the present invention adopts the following technical solution:

A method for three-dimensional measurement and calculation of the geographic position of a target object based on a street view map, comprising the following steps:

Step 1: selecting two viewpoints in the viewing angle range covering the target object to be measured and calculated in the street view map;

Step 2: obtaining the longitudes and latitudes of the two selected viewpoints;

Step 3: adjusting the bottom and top of the target object to the central position of the street view map under each viewpoint respectively;

Specifically, adjusting a point on the bottom/top of the target object to the central position of the street view map under each viewpoint respectively, making sure the line connecting the point selected on the top and the point selected on the bottom is on a same vertical straight line;

Step 4: obtaining viewing angle parameters of the target object relative to viewpoints in each state in step 3, including horizontal angle and pitch angle;

The horizontal angle means the compass heading of the lens of the camera in use. The range of acceptable values is 0°~360° (both values denote north, 90° denotes east, and 180° denotes south).

Said pitch angle means the upward or downward angle of the lens of the camera in use relative to the Street View vehicle. A positive value means an upward angle of the camera lens (90° means the camera lens is vertically upward), while a negative value means a downward angle of the camera lens (−90° means the camera lens is vertically downward).

Step 5: establishing two unparallel spatial straight lines in a polar coordinate system according to two viewpoints and horizontal angles from the viewpoints to the bottom of the target object;

Step 6: calculating the intersection of the two spatial straight lines, of which longitude and latitude are a position projected by the bottom of the target object onto a horizontal plane, i.e., the actual geographic position of the target object;

Step 7: calculating the distance from any of the two selected viewpoints to the bottom of the target object on a horizontal plane according to the longitude and latitude of the viewpoint and the longitude and latitude of the bottom of the target object, and calculating the relative heights of the top and bottom of the target object from the viewpoint respectively according to the pitch angles from the viewpoint to the top and bottom of the target object;

Step 8: obtaining the actual height of the target object by subtracting the relative height between the bottom of the target object and the viewpoint from the relative height between the top of the target object and the viewpoint.

Said step 1 of the method of the present invention further comprises adjusting the viewing angles and the fields of view under the viewpoints after selection of two viewpoints and adjusting the target object to an appropriate position of the street view map.

Said viewpoints mean the geographic positions where the camera is located when shooting the street view images, and are expressed with longitudes and latitudes. Different viewpoints mean different geographic positions where the camera is located when shooting street view images.

Further, in said step 1, the target object is adjusted to an appropriate position of the street view map by rotating street view images; specifically, the target object is clearly brought into the field of view as a whole without blockage of obstacles by rotating and adjusting street view images.

In said step 2 of the method of the present invention, longitudes and latitudes are obtained from shooting parameters of viewpoints;

In said step 3 of the method of the present invention, under the two selected viewpoints, the bottom and top of the target object are adjusted to the central position of the street view map respectively;

Said central position of the street view map means the position of the intersection between a centerline in a horizontal direction and a centerline in a vertical direction in the display window of the street view map.

The calculation method of the present invention synoptically comprises: selecting a target object in a street view map at first and then selecting two appropriate viewpoints according to the target object; adjusting the bottom/top of the target object to the central position of the street view map under each viewpoint and obtaining viewpoint parameters from the viewpoints to the bottom/top of the target object; determining two spatial straight lines according to the longitudes and latitudes of the viewpoints and the viewing angles from the viewpoints to the bottom of the target object and calculating the intersection of the two straight lines, of which longitude and latitude are the longitude and latitude of the target object in the actual geographic space; calculating the distance from a viewpoint to the target object on a horizontal plane according to the longitude and latitude of the viewpoint and the obtained longitude and latitude of the target object, calculating the relative heights of the top and bottom of the target object from the viewpoint respectively according to the pitch angles from the viewpoint to the top and bottom of the target object respectively and obtaining the actual height of the target object, which is the difference between the two relative heights.

The present invention further provides an apparatus employed to achieve the foregoing method, comprising:

a device for selecting two viewpoints in the viewing angle range covering the target object to be measured and calculated in the street view map;

a device for obtaining the longitudes and latitudes of the two selected viewpoints;

a device for adjusting a point on the bottom/top of the target object to the central position of the street view map under each viewpoint respectively;

a device for obtaining viewing angle parameters of the target object relative to viewpoints in each state, including horizontal angle and pitch angle;

a device for establishing two unparallel spatial straight lines in a polar coordinate system according to two viewpoints and horizontal angles from the viewpoints to the bottom of the target object;

a device for solving the longitude and latitude of the intersection of two spatial straight lines;

a device for calculating the distance from any of the two selected viewpoints to the bottom of the target object on a horizontal plane according to the longitude and latitude of the viewpoint and the longitude and latitude of the bottom of the target object, and calculating the relative heights of the top and bottom of the target object from the viewpoint respectively according to the pitch angles from the viewpoint to the top and bottom of the target object;

a device for subtracting the relative height between the bottom of the target object and the viewpoint from the relative height between the top of the target object and the viewpoint.

Among the foregoing devices of the present invention, said device for selecting two viewpoints in the viewing angle range covering the target object to be measured and calculated in the street view map comprises a device for adjusting the viewing angles and the fields of view under the viewpoints after selection of two viewpoints and adjusting the target object to an appropriate position of the street view map.

Preferably, there is a device for adjusting the target object to an appropriate position of the street view map by rotating street view images;

Specifically, a device for bringing the target object clearly into the field of view as a whole without blockage of obstacles by rotating and adjusting street view images.

Said device for obtaining the longitudes and latitudes of the two selected viewpoints comprises a device for obtaining longitudes and latitudes of viewpoints from shooting parameters of the viewpoints.

Said device for adjusting a point on the bottom/top of the target object to the central position of the street view map under each viewpoint respectively comprises a device for adjusting a point on the bottom/top of the target object to the central position of the street view map under each viewpoint respectively, wherein said point is the central point or angular point of the top or bottom of the target object.

The present invention effectively utilizes existing street view resources, achieves direct acquisition of geographic positions of surface features and measurement of actual heights of surface features in the street view map and is conducive to the further application of existing street view resources in the aspects of smart city and intelligent transportation.

DETAILED DESCRIPTION OF PREFERRED EMBODIMENTS

The present invention will now be further described by referring to the accompanying drawings and embodiments.

Embodiment 1

Figure 1:
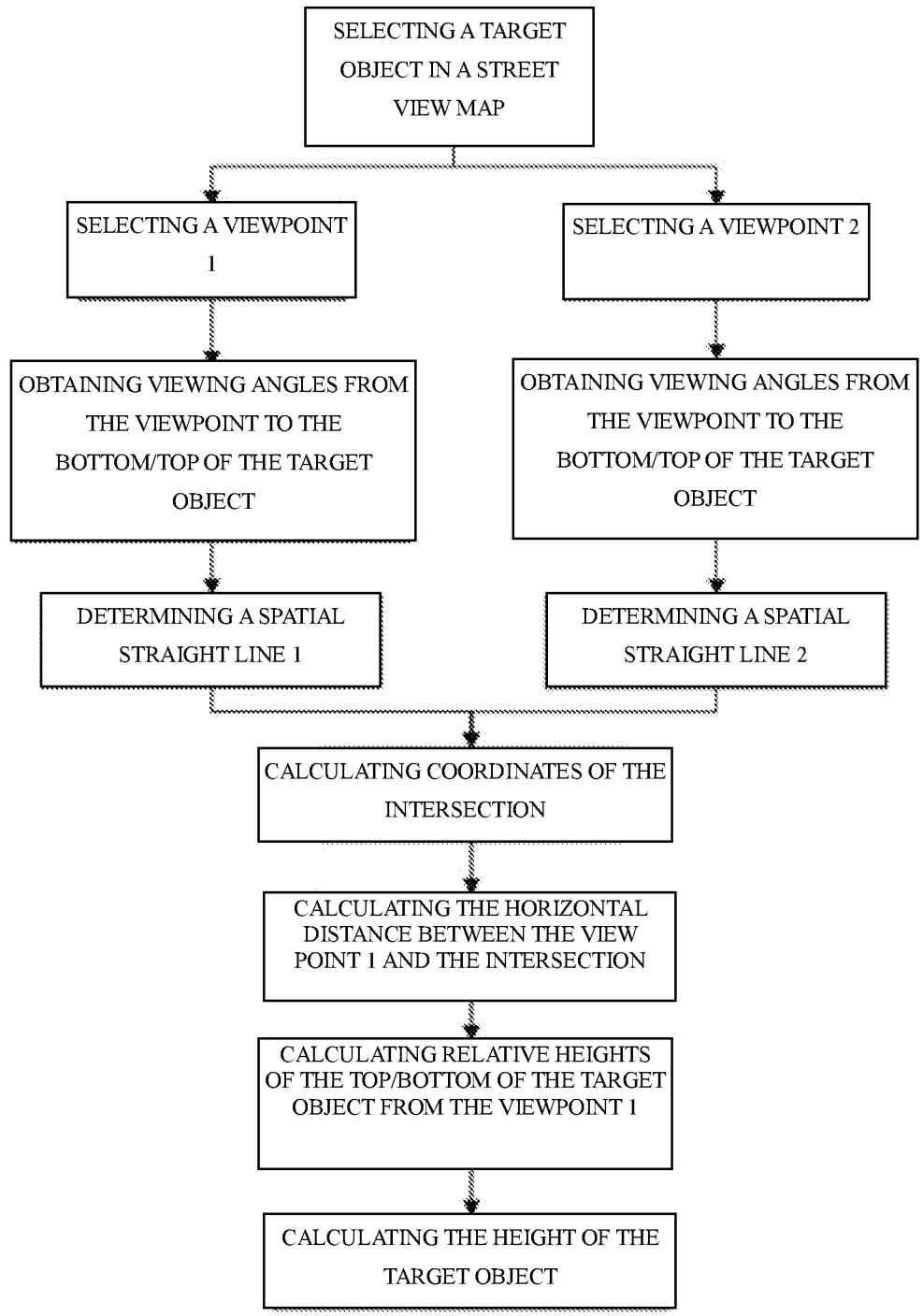
FIG. 1 is a flow diagram of the method of the present invention.

This embodiment takes street view map of Google as an example and further describes a technical solution of the method provided by the present invention. As shown in FIG. 1, the flow of the present invention comprises the following steps:

Step 1: selecting two viewpoints in the viewing angle range covering the target object to be measured and calculated in the Google street view map;

Step 2: obtaining the longitudes and latitudes of the two selected viewpoints in the street view map;

Step 3: adjusting the bottom/top of the target object to the central position of the street view map under each viewpoint respectively;

Step 4: obtaining viewing angle parameters of the target object relative to viewpoints in each state in step 3, including horizontal angle and pitch angle;

Step 5: establishing two unparallel spatial straight lines in a polar coordinate system according to two viewpoints and horizontal angles from the viewpoints to the bottom of the target object;

Step 6: calculating the intersection of the two spatial straight lines, of which longitude and latitude are a position projected by the bottom of the target object onto a horizontal plane, i.e., the actual geographic position of the target object.

Step 7: calculating the distance from any of the two selected viewpoints to the bottom of the target object on a horizontal plane according to the longitude and latitude of the viewpoint and the longitude and latitude of the bottom of the target object, and calculating the relative heights of the top and bottom of the target object from the viewpoint respectively according to the pitch angles from the viewpoint to the top and bottom of the target object;

Step 8: obtaining the actual height of the target object by subtracting the relative height between the bottom of the target object and the viewpoint from the relative height between the top of the target object and the viewpoint.

The specific implementation steps are as follows:

Step 1: selecting a specific target object at first and then selecting two different appropriate viewpoints in the street view map according to the target object;

Said viewpoints mean the geographic positions where the camera is located when shooting the street view images, and are expressed with longitudes and latitudes. Different viewpoints mean different geographic positions where the camera is located when shooting street view images. In this embodiment, the target object is adjusted to an appropriate position of the street view map by rotating street view images; specifically, the target object is clearly brought into the field of view as a whole without blockage of obstacles by rotating and adjusting street view images.

Step 2: obtaining the longitudes and latitudes of two street view viewpoints according to relevant service of Google street view map; the shooting parameters of the street view map contain information of longitudes and latitudes of the viewpoints, and other street view maps may acquire information of longitudes and latitudes of viewpoints by corresponding methods.

Longitudes and latitudes of viewpoints may be obtained according to API of Google Street view map API. The specific codes are as follows:

//obtain the longitude and latitude of a viewpoint var lat=panorama.getPosition( )lat( )

var lng=panorama.getPosition( ).lng( )

where, lat is the latitude of the viewpoint, and lng is the longitude of the viewpoint;

Step 3: adjusting a point on the bottom/top of the target object to the central position of the street view map under each of the foregoing two viewpoints respectively; to facilitate adjustment, an angular point/central point of the top or bottom is selected; the line connecting the point selected on the top and the point selected on the bottom is on a same vertical straight line. Taking a rectangular target object for example, if an angular point on the front left of the top surface is selected, an angular point on the front left of the bottom surface should be selected.

Said central position of the street view map means the position of the intersection between a centerline in a horizontal direction and a centerline in a vertical direction in the display window of the street view map.

Step 4: obtaining viewing angle parameters in each state in step 3, including horizontal angle and pitch angle;

Said horizontal angle means the compass heading of the lens of the camera in use. The range of acceptable values is 0° ~360° (both values denote north, 90° denotes east, and 180° denotes south).

Said pitch angle means the upward or downward angle of the lens of the camera in use relative to the street view vehicle. A positive value means an upward angle of the camera lens (90° means the camera lens is vertically upward), while a negative value means a downward angle of the camera lens (−90° means the camera lens is vertically downward).

Figure 2:
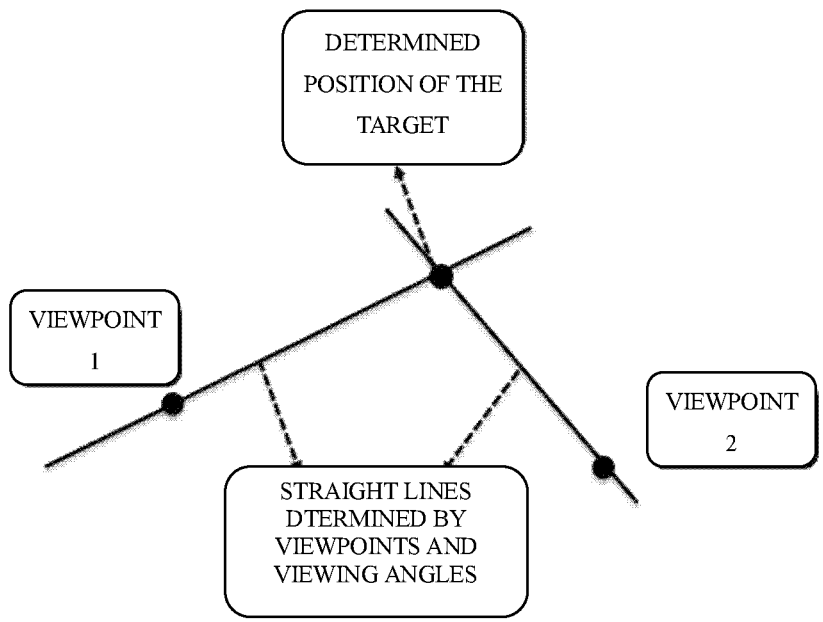
FIG. 2 is a schematic diagram for solving the geographic position of a target object according to the present invention.
Figure 3:
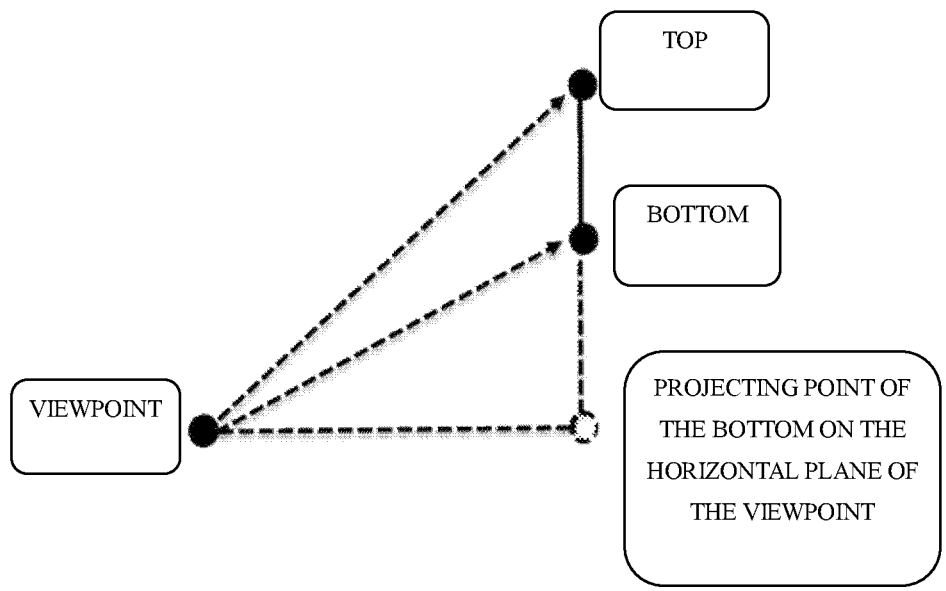
FIG. 3 is a schematic diagram of the actual height of a target object according to the present invention.

The achieved codes are as follows:

//obtain a horizontal angle of the current viewing angle var heading=panorama.getPov( )heading;

//obtain a pitch angle of the current viewing angle var pitch=panorama.getPov( )pitch;

Step 5: When the longitude and latitude of a viewpoint and the horizontal angle from the viewpoint to the bottom of the target object are known, a spatial straight line may be determined according to the polar coordinate system. Two different viewpoints establish two different spatial straight lines. The specific codes are as follows:

//k1 and k2 are slopes of two spatial straight lines var $k1$=1/Math.tan(heading1/180*Math.PI);

var $k2$=1/Math.tan(heading2/180*Math.PI);

//b1 and b2 are intercepts of two spatial straight lines var $b1$=lat1−$k1$*lng1;

var $b2$=lat2−$k2$*lng2;

Step 6: as shown in FIG. 2, calculating the intersection of the two spatial straight lines, of which longitude and latitude are a position projected by the bottom of the target object onto a horizontal plane, i.e., the actual geographic position of the target object. The specific codes are as follows:

//intersection of two straight lines, i.e., the geographic position of the target object var lngT=($b2$−$b1$)/($k1$−$k2$);

var latT=$y0$*$k1$+$b1$;

where, latT is the latitude of the intersection, and lngT is the longitude of the intersection;

Step 7: As shown in FIG. 3, calculating the distance from a viewpoint to the bottom of the target object on a horizontal plane according to the longitude and latitude of the viewpoint and the longitude and latitude of the bottom of the target object, and calculating the relative heights of the top and bottom of the target object from the viewpoint respectively according to the pitch angles from the viewpoint to the top and bottom of the target object. The specific codes are as follows:

```
//calculate the distance between two points according to the viewpoints and the longitude and
latitude of the bottom of the target object
var xyDistance = GetDistance(latT,lngT,lat,lng);
function GetDistance( lat1, lng1, lat2, lng2)
{
var radLat1 = rad(lat1);
var radLat2 = rad(lat2);
```

```
var a = radLat1 – radLat2;
var b = rad(lng1) – rad(lng2);
var s = 2 * Math.asin(Math.sqrt(Math.pow(Math.sin(a/2),2) +
Math.cos(radLat1)*Math.cos(radLat2)*Math.pow(Math.sin(b/2),2)));
    s = s * EARTH_RADIUS;//earth radius
    s = Math.round(s * 10000) / 10;
return s;
}
//calculate the relative height of the target object from the viewpoint according to pitch angle
and the horizontal distance between the target object and the viewpoint
var z1 = xyDistance * Math.tan(pitchBottom/180*Math.PI);
var z2 = xyDistance * Math.tan(pitchTop/180*Math.PI);
```

Step 8: obtaining the actual height of the target object by subtracting the relative height between the bottom of the target object and the viewpoint from the relative height between the top of the target object and the viewpoint. The specific codes are as follows:

//obtain the actual height of the target object by subtracting the relative height between the bottom of the target object and the viewpoint from the relative height between the top of the target object and the viewpoint var height=z2–z1;

The height is the calculated actual height of the target object.

Embodiment 2

This embodiment describes a specific technical solution of the apparatus provided by the present invention.

As shown in FIG. 1, an apparatus for three-dimensional measurement and calculation of the geographic position of a target object based on a street view map, comprising:

a device for selecting two viewpoints in the viewing angle range covering the target object to be measured and calculated in the street view map, comprising a device for adjusting the viewing angles and the fields of view under the viewpoints after selection of two viewpoints and adjusting the target object to an appropriate position of the street view map, preferably, a device for adjusting the target object to an appropriate position of the street view map by rotating street view images; specifically, a device for bringing the target object clearly into the field of view as a whole without blockage of obstacles by rotating and adjusting street view images.

a device for obtaining the longitudes and latitudes of the two selected viewpoints, comprising a device for obtaining longitudes and latitudes of viewpoints from shooting parameters of the viewpoints;

a device for adjusting a point on the bottom/top of the target object to the central position of the street view map under each viewpoint respectively, comprising a device for adjusting a point on the bottom/top of the target object to the central position of the street view map under each viewpoint respectively, wherein said point is the central point or angular point of the top or bottom of the target object;

a device for obtaining viewing angle parameters of the target object relative to viewpoints in each state, including horizontal angle and pitch angle;

a device for establishing two unparallel spatial straight lines in a polar coordinate system according to two viewpoints and horizontal angles from the viewpoints to the bottom of the target object;

a device for solving the longitude and latitude of the intersection of two spatial straight lines, as shown in FIG. 2;

a device for calculating the distance from any of the two selected viewpoints to the bottom of the target object on a horizontal plane according to the longitude and latitude of the viewpoint and the longitude and latitude of the bottom of the target object, and calculating the relative heights of the top and bottom of the target object from the viewpoint respectively according to the pitch angles from the viewpoint to the top and bottom of the target object, as shown in FIG. 3;

a device for subtracting the relative height between the bottom of the target object and the viewpoint from the relative height between the top of the target object and the viewpoint.

What is claimed is:

1. A method for three-dimensional measurement and calculation of the geographic position of a target object based on a street view map, wherein the method comprises the following steps:

step 1: selecting two viewpoints in a viewing angle range covering the target object to be measured and calculated in the street view map;

step 2: obtaining the longitudes and latitudes of the two selected viewpoints;

step 3: adjusting a point on a bottom and a top of the target object to a central position of the street view map under each viewpoint, respectively, wherein a line connecting the point selected on the top and the point selected on the bottom is on a same vertical straight line;

step 4: obtaining viewing angle parameters of the target object relative to viewpoints in each state in step 3, including horizontal angle and pitch angle;

step 5: establishing two non-parallel spatial straight lines in a polar coordinate system according to two viewpoints and horizontal angles from the viewpoints to the bottom of the target object;

step 6: calculating the intersection of the two spatial straight lines, of which longitude and latitude are a position projected by the bottom of the target object onto a horizontal plane, wherein the projected position is an actual geographic position of the target object;

step 7: calculating a distance from any of the two selected viewpoints to the bottom of the target object on a horizontal plane according to the longitude and latitude of the viewpoint and the longitude and latitude of the bottom of the target object, and calculating relative heights of the top and bottom of the target object from the viewpoint respectively according to the pitch angles from the viewpoint to the top and bottom of the target object; and step 8: obtaining the actual height of the target object by subtracting the relative height between the bottom of the target object and the viewpoint from the relative height between the top of the target object and the viewpoint.

2. The method according to claim 1, wherein in said step 1, after selection of two viewpoints, the viewing angles and the fields of view under the viewpoints are adjusted and the target object is adjusted to an appropriate position of the street view map.

3. The method according to claim 2, wherein in said step 1, the target object is adjusted to an appropriate position of the street view map, wherein the target object is brought into the field of view as a whole without blockage of obstacles by rotating and adjusting street view images.

4. The method according to claim 1, wherein in said step 2, longitudes and latitudes are obtained from shooting parameters of viewpoints.

5. The method according to claim 1, wherein in said step 3, a point on the bottom and top of the target object is adjusted to the central position of the street view map under each viewpoint respectively, wherein said point is the central point or angular point of the top or bottom of the target object.

6. An apparatus for three-dimensional measurement and calculation of the geographic position of a target object based on a street view map, wherein the apparatus comprises:
  a device for selecting two viewpoints in the viewing angle range covering the target object to be measured and calculated in the street view map;
  a device for obtaining the longitudes and latitudes of the two selected viewpoints;
  a device for adjusting a point on a bottom and a top of the target object to the central position of the street view map under each viewpoint respectively;
  a device for obtaining viewing angle parameters of the target object relative to viewpoints in each state, including horizontal angle and pitch angle;
  a device for establishing two non-parallel spatial straight lines in a polar coordinate system according to two viewpoints and horizontal angles from the viewpoints to the bottom of the target object;
  a device for solving the longitude and latitude of the intersection of two spatial straight lines;
  a device for calculating the distance from any of the two selected viewpoints to the bottom of the target object on a horizontal plane according to the longitude and latitude of the viewpoint and the longitude and latitude of the bottom of the target object, and calculating the relative heights of the top and bottom of the target object from the viewpoint respectively according to the pitch angles from the viewpoint to the top and bottom of the target object; and
  a device for subtracting the relative height between the bottom of the target object and the viewpoint from the relative height between the top of the target object and the viewpoint.

7. The apparatus according to claim 6, wherein said device for selecting two viewpoints in the viewing angle range covering the target object to be measured and calculated in the street view map comprises a device for adjusting the viewing angles and the fields of view under the viewpoints after selection of two viewpoints and adjusting the target object to an appropriate position of the street view map.

8. The apparatus according to claim 7, wherein said device for selecting two viewpoints in the viewing angle range covering the target object to be measured and calculated in the street view map comprises a device for bringing the target object clearly into the field of view as a whole without blockage of obstacles by rotating and adjusting street view images.

9. The apparatus according to claim 6, wherein said device for obtaining the longitudes and latitudes of the two selected viewpoints comprises a device for obtaining longitudes and latitudes of viewpoints from shooting parameters of the viewpoints.

10. The apparatus according to claim 6, wherein said device for adjusting a point on the bottom/top of the target object to the central position of the street view map under each viewpoint respectively comprises a device for adjusting a point on the bottom/top of the target object to the central position of the street view map under each viewpoint respectively, wherein said point is the central point or angular point of the top or bottom of the target object.

* * * * *